No. 621,004. Patented Mar. 14, 1899.
J. WEIGEL.
CONVERTIBLE HANDLE AND GUARD BAR FOR STREET CARS.
(Application filed Dec. 10, 1898.)
(No Model.)
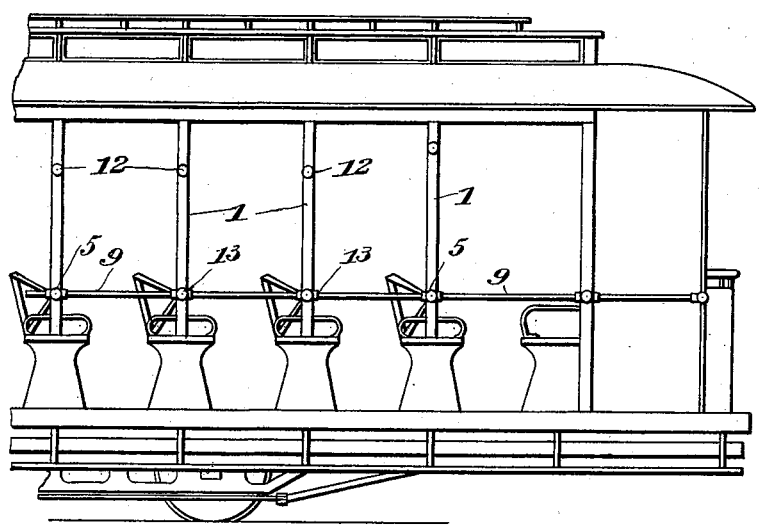
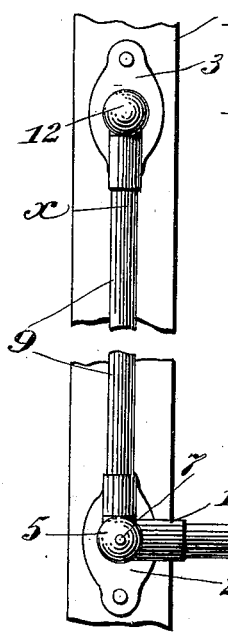
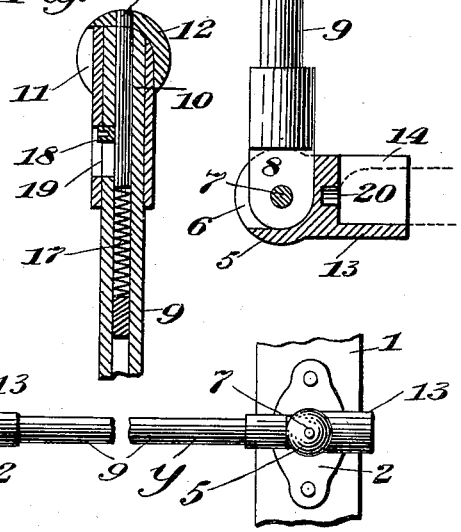
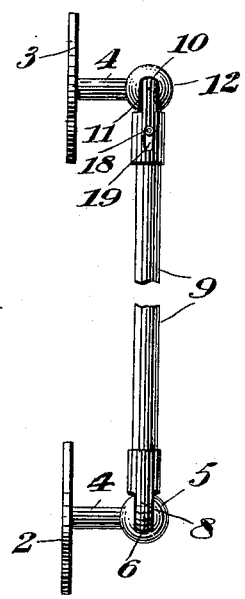
Witnesses
Inventor

UNITED STATES PATENT OFFICE.

JOHN WEIGEL, OF CINCINNATI, OHIO.

CONVERTIBLE HANDLE AND GUARD-BAR FOR STREET-CARS.

SPECIFICATION forming part of Letters Patent No. 621,004, dated March 14, 1899.

Application filed December 10, 1898. Serial No. 698,878. (No model.)

*To all whom it may concern:*

Be it known that I, JOHN WEIGEL, a citizen of the United States, residing at Cincinnati, in the county of Hamilton and State of Ohio, have invented certain new and useful Improvements in Convertible Handles and Guard-Bars for Street-Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in convertible handles and guard-bars for use on street-railway cars (particularly open summer-cars) and the like, and has for its object to provide a device capable of ready application to cars of ordinary construction and adapted for convenient adjustment to permit of being employed either as a handle to aid the passenger in getting aboard the car or as a guard-bar to prevent the passenger from entering or leaving the car on the side facing cars approaching or passing in either direction on an adjacent track.

The invention consists in certain novel features of the construction, combination, and arrangement of the several parts of the improved device, whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate my invention, Figure 1 is a partial side view of a street-car having my improved convertible handle and guard-bar applied thereto. Fig. 2 is an enlarged detail view showing portions of the uprights of the car to which the device is applied. Fig. 3 is a side view of one of the handles or guard-bars shown in Fig. 2. Fig. 4 is an enlarged sectional detail view taken through the upper bracket of the device and showing the handle or guard-bar engaged therewith, and Fig. 5 is a similar view taken through the lower bracket of the device.

In the views, 1 indicates the uprights at the sides of the car and forming part of the framing thereof, and 2 and 3 indicate brackets screwed or otherwise secured to each of said uprights, the brackets 3 being arranged above the brackets 2, which latter are alined with each other lengthwise of the car. Each of the brackets 2 and 3 has an integral lug 4 projecting from it, the lugs 4 of the lower brackets 2 being formed with ball-shaped heads or enlargements 5 at their outer ends, wherein are formed recesses 6, across which extend pintles 7, whereon are pivotally mounted the guard bars or rods 9, which, as shown in Figs. 3 and 5, have flattened end portions 8, adapted to fit within the recesses 6. The opposite ends 10 of the bars 9 are also flattened and are adapted to enter recesses 11, formed in ball-shaped heads or enlargements 12 on the outer ends of the lugs 4 of the upper brackets 3, when the bars 9 are swung pivotally upon their pintles 7, so as to stand in a vertical position, as shown at *x* in Fig. 2, thereby forming convenient handles extending lengthwise of the uprights 1 and adapted to be grasped by the passengers in boarding the car. The lugs 4 of the lower series of brackets 2 also have at their outer ends integral projecting portions 13, which extend from the ball-shaped heads or enlargements 5 in the planes in which the bars 9 swing upon their pintles and are provided with open-topped sockets 14, each adapted to receive the flattened end 10 of the guard-bar which is pivoted upon the next adjacent bracket 2 when said guard-bar is swung pivotally downward to a horizontal position, as shown in Fig. 1 and at *v* in Fig. 2.

In order to lock the bars 9 securely in place in either of their positions, I arrange in the hollow of each a sliding bolt 16, backed by a spring 17, which serves to hold said bolt with its end normally protruding from the end of the bar 9, and in the walls of the respective recesses 11 and 14 I form sockets, as clearly shown at 20 in Fig. 5, adapted to be engaged by said bolts. The bolts 16 are also provided with lugs 18, playing in slots 19 and forming stops to limit the movement of the bolts, said lugs being provided at their outer ends with recesses adapted for the insertion of a key carried by the conductor, so that the bolts may be pushed back to free the bars 9 and permit the said bars to be swung from one position to the other. The lug 18 being below the plane of the surface of the rod or bar 9 insures that the adjustment of said rod or bar shall not be changed by an unauthorized person. By this construction it will be seen that the bars 9 are free to be moved pivotally on their pintles 7, either to a vertical position, as indicated at $x$ in Fig. 2, so as to serve as handles to be grasped by the passengers, in which case their flattened ends 10 are engaged with the sockets or recesses 11 of the heads 12, or to a horizontal position, as shown in Fig. 1 and at $v$ in Fig. 2, so as to extend across the space between each two adjacent uprights 1, which latter are usually arranged at the seats of the car, so as to form obstructing guard-bars to prevent passengers from entering or leaving the car, their ends 10 being in this case engaged with the sockets or recesses 6 of the heads 5 of the lower brackets. In this way it will be seen that a considerable economy is effected in the construction of the car, and at the same time the employment of the ordinary guard-bar extending the full length of the car is avoided. When the device is used on the platforms of the cars, a further economy is effected, since the use of platform-gates is thereby dispensed with.

From the above description it will be seen that the device constructed according to my invention is extremely simple and inexpensive, and it will also be obvious from the above description that the device is capable of some modification without material departure from the principles and spirit of the invention, and for this reason I do not wish to be understood as limiting myself to the precise form and arrangement of the several parts herein set forth.

Having thus described my invention, what I claim, and desire to secure by Letters Patent, is—

1. A convertible handle and guard-bar for street-railway cars and the like, comprising upper and lower brackets having heads and secured to the uprights of the car, and bars pivoted to the heads of the lower brackets and adapted to be engaged with the heads of the upper brackets, the heads of the lower brackets being each formed with a recess to receive the end of a bar pivoted to the next adjacent lower bracket, substantially as set forth.

2. A convertible handle and guard-bar for street-railway cars and the like, comprising upper and lower brackets having heads and secured to the uprights of the car, bars pivoted to the heads of the lower brackets and adapted to be engaged with the heads of the upper brackets, the head of each lower bracket being formed with a socket to receive the end of a bar pivoted to the next adjacent lower bracket, and means to lock the bars when their ends are engaged with the sockets of the lower brackets, substantially as set forth.

3. A convertible handle and guard-bar for street-railway cars and the like, comprising upper and lower brackets having heads and secured to the uprights of the car, the heads of the lower brackets having recesses and being provided with projecting portions having sockets and the heads of the upper brackets being provided with recesses, bars pivoted in the recesses of the heads of the lower brackets and having their ends adapted to be engaged in the recesses in the heads of the upper brackets and in the sockets of the projecting portions of the lower brackets, and means to lock said bars in raised and lowered position, substantially as set forth.

In testimony whereof I affix my signature in presence of two witnesses.

JOHN WEIGEL.

Witnesses:
JOHN ELIAS JONES,
LILLIE WEIGEL.